(12) United States Patent
Di Perna et al.

(10) Patent No.: US 10,125,659 B2
(45) Date of Patent: Nov. 13, 2018

(54) EXHAUST GAS TREATMENT DEVICE HAVING INTEGRATED GAS SAMPLING SENSOR

(71) Applicant: GM GLOBAL TECHNOLOGY OPERATIONS LLC, Detroit, MI (US)

(72) Inventors: Luciano Nunziato Di Perna, Troy, MI (US); Jianwen Li, Farmington Hills, MI (US); Raffaello Ardanese, Bloomfield Hills, MI (US); Rahul Mital, Rochester Hills, MI (US); David B. Brown, Brighton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 197 days.

(21) Appl. No.: 15/202,981

(22) Filed: Jul. 6, 2016

(65) Prior Publication Data

US 2018/0010507 A1    Jan. 11, 2018

(51) Int. Cl.
*B01D 53/94* (2006.01)
*F01N 13/00* (2010.01)
*F01N 3/28* (2006.01)

(52) U.S. Cl.
CPC .......... *F01N 13/008* (2013.01); *B01D 53/94* (2013.01); *F01N 3/2803* (2013.01); *B01D 2255/1021* (2013.01); *B01D 2255/1023* (2013.01); *B01D 2255/1025* (2013.01); *B01D 2255/2065* (2013.01); *B01D 2255/2073* (2013.01); *B01D 2255/2092* (2013.01); *B01D 2255/20738* (2013.01); *B01D 2255/20753* (2013.01); *B01D 2255/20761* (2013.01); *F01N 2370/02* (2013.01); *F01N 2560/021* (2013.01);
(Continued)

(58) Field of Classification Search
CPC ................ B01D 53/94; B01D 53/9454; B01D 2255/1021; B01D 2255/1023; B01D 2255/1025; B01D 2255/2065; B01D 2255/2073; B01D 2255/20738; B01D 2255/20753; B01D 2255/20761; B01D 2255/2092; F01N 13/008; F01N 3/2803; F01N 2370/02; F01N 2560/02; F01N 2560/021; F01N 2560/025; F01N 2560/026; F01N 2560/05
See application file for complete search history.

(56) References Cited

U.S. PATENT DOCUMENTS

2008/0170972 A1*  7/2008  Cai ..................... B01D 53/9454
                                                    422/177
2008/0282673 A1* 11/2008  Gonze ................... B60K 6/445
                                                    60/284

* cited by examiner

*Primary Examiner* — Brandon Lee
(74) *Attorney, Agent, or Firm* — Quinn IP Law

(57) ABSTRACT

An exhaust gas treatment device includes a housing having a wall. The wall of the housing defines an interior chamber. A substrate is supported by the housing within the interior chamber of the housing. The substrate extends along a longitudinal axis. The substrate includes a flow through structure that allows the flow of exhaust gas to flow through the substrate. The substrate includes a catalytic composition disposed thereon for reacting with the flow of exhaust gas. The substrate includes a cavity, extending along a cavity axis, which is transverse to the longitudinal axis of the substrate. A sensor is attached to the housing. The sensor includes a probe that at least partially extends into the cavity of the substrate, for sensing a gaseous component in the flow of exhaust gas. The cavity mixes the flow of exhaust gas and directs the exhaust gas toward the probe of the sensor.

13 Claims, 3 Drawing Sheets

(52) U.S. Cl.
CPC .. *F01N 2560/025* (2013.01); *F01N 2560/026* (2013.01); *F01N 2560/05* (2013.01)

EXHAUST GAS TREATMENT DEVICE HAVING INTEGRATED GAS SAMPLING SENSOR

TECHNICAL FIELD

The disclosure generally relates to an exhaust gas treatment device for treating exhaust gas from an engine of a vehicle.

BACKGROUND

Vehicles with an internal combustion engine are typically equipped with an exhaust gas treatment system for treating the exhaust gas from the engine. The exhaust gas treatment system typically includes a treatment device, such as but not limited to a catalytic converter, a diesel oxidation catalyst, a selective catalytic reduction system, etc., which includes a catalytic composition that reacts with the exhaust gas. The catalytic composition may, for example, reduce nitrogen oxides ($NO_x$) in the exhaust gas to nitrogen and oxygen, oxidize carbon monoxide (CO) in the exhaust gas to carbon dioxide, or oxidize hydrocarbons (HCs) in the exhaust gas to carbon dioxide and water.

Proper control and operation of the exhaust gas treatment systems requires monitoring or sensing the current composition of the exhaust gas. Accordingly, the exhaust gas treatment systems typically include one or more sensors for sensing or sampling the exhaust gas, for one or more components of the exhaust gas. For example, the sensors of the exhaust gas system may sense an oxygen level in the exhaust gas, or a $NO_x$ level in the exhaust gas.

SUMMARY

An exhaust gas treatment device for treating a flow of exhaust gas from an internal combustion engine is provided. The exhaust gas treatment device includes a housing defining an interior chamber, and a substrate supported by the housing within the interior chamber of the housing. The substrate includes a flow through structure allowing the flow of exhaust gas to flow through the substrate. A catalytic composition for reacting with the flow of exhaust gas is disposed on the substrate. The substrate includes a cavity. A sensor is attached to the housing, and includes a probe at least partially extending into the cavity of the substrate.

An engine system is also provided. The engine system includes an internal combustion engine that is operable to produce a flow of exhaust gas. An exhaust gas treatment system is coupled to the internal combustion engine for receiving the flow of exhaust gas. The exhaust gas treatment system includes a treatment device. The treatment device includes a housing having a wall. The wall of the housing defines an interior chamber, and includes an inlet for receiving the flow of exhaust gas, and an outlet for discharging the flow of exhaust gas. A substrate is supported by the housing within the interior chamber of the housing. The substrate extends along a longitudinal axis, generally between the inlet and the outlet of the housing. The substrate includes a flow through structure that allows the flow of exhaust gas to flow through the substrate. The substrate includes a catalytic composition disposed thereon for reacting with the flow of exhaust gas. The substrate includes a cavity, extending along a cavity axis, which is transverse to the longitudinal axis of the substrate. A sensor is attached to the housing. The sensor includes a probe that at least partially extends into the cavity of the substrate, for sensing a gaseous component in the flow of exhaust gas.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Figure 1:
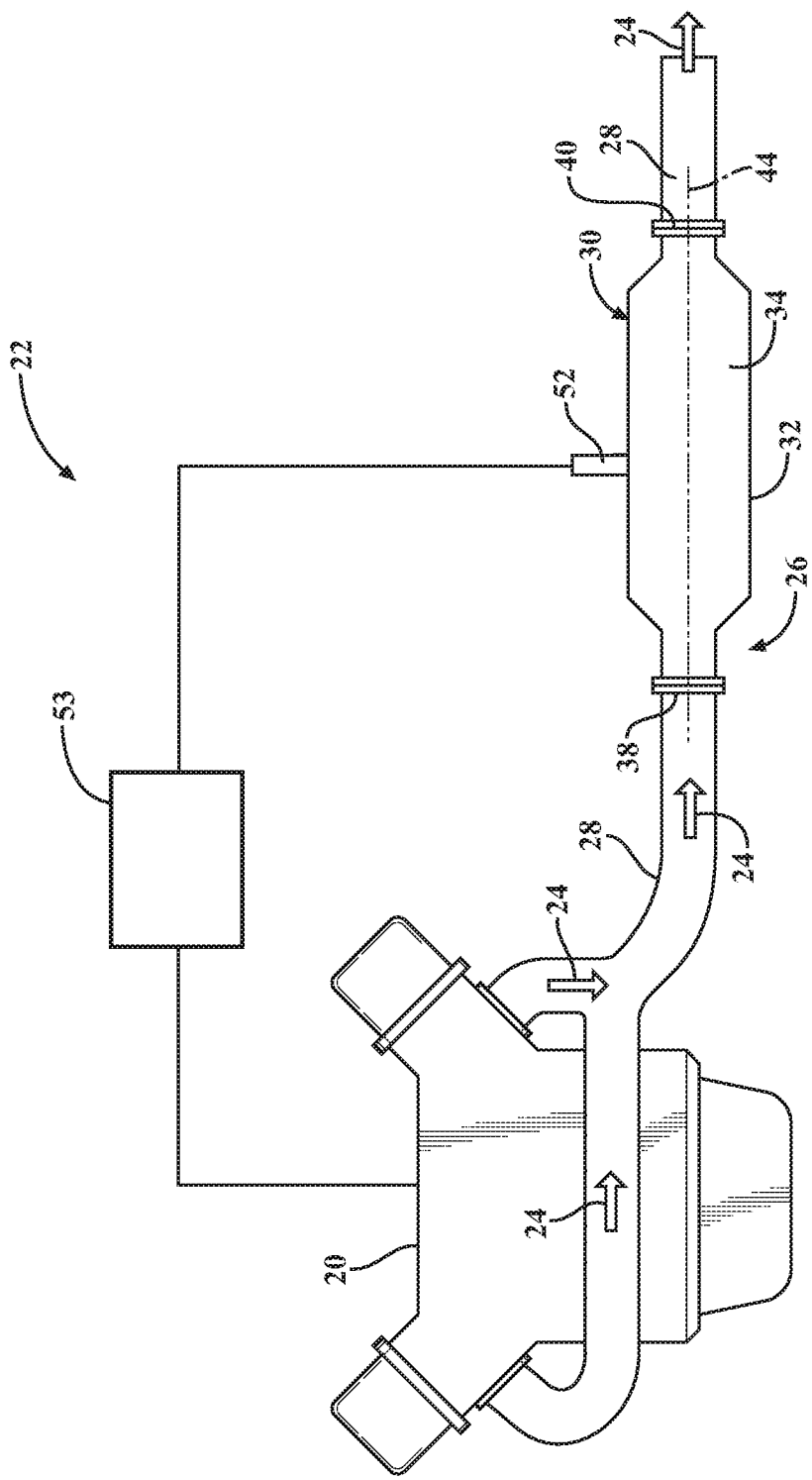
FIG. 1 is a schematic plan view showing an internal combustion engine and an exhaust gas treatment system.

Referring to the Figures, wherein like numerals indicate like parts throughout the several views, an internal combustion engine is generally shown at 20. Referring to FIG. 1, the internal combustion engine 20 may be incorporated into and be part of an engine system 22. The engine system 22 may be part of and used in, but is not limited to, an automobile, a truck, a boat, an ATV, a tractor, etc. Alternatively, the engine system 22 may be incorporated into a stationary device, such as a generator, etc. The internal combustion engine 20 may include, but is not limited to, a spark ignition engine or a compression ignition engine. The internal combustion engine 20 is operable to produce a flow of exhaust gas 24, as is known in the art.

As shown in FIG. 1, the engine system 22 includes the internal combustion engine 20, and an exhaust gas treatment system 26 that is coupled to the internal combustion engine 20. The exhaust gas treatment system 26 receives the flow of exhaust gas 24 from the internal combustion engine 20, treats the flow of exhaust gas 24, and then discharges the flow of exhaust gas 24 to the atmosphere. The exhaust gas treatment system 26 includes a system of connecting pipes 28 and one or more treatment devices 30 that are connected together in fluid communication to conduct the flow of exhaust gas 24 there through, as is known in the art.

Referring to FIGS. 2 through 7, at least one of the treatment devices 30 in the exhaust gas treatment system 26 includes a housing 32. The housing 32 includes a wall 34 forming or defining an interior chamber 36. The housing 32 includes an inlet 38 for receiving the flow of exhaust gas 24, and an outlet 40 for discharging the flow of exhaust gas 24. The housing 32 may be formed into any desirable shape suitable for the particular application. For example, and as shown in the Figures, the housing 32 includes a generally cylindrical shape. However, it should be appreciated that the shape of the housing 32 is not limited to the exemplary embodiment shown in the Figures. For example, the housing 32 may include a more rectangular shape.

A substrate 42 is supported by the housing 32, and is disposed within the interior chamber 36 of the housing 32. The substrate 42 includes a flow through structure that allows the flow of exhaust gas 24 to flow through the substrate 42. The substrate 42 may include, but is not limited to, a ceramic honeycomb structure, or a metallic foil structure, as is known in the art. The substrate 42 extends along a longitudinal axis 44, generally between the inlet 38 and the outlet 40 of the housing 32. The longitudinal axis 44 of the substrate 42 may be considered to be or is defined by a center of the substrate 42. While the exemplary embodiment shown in the Figures includes the inlet 38 and the outlet 40 being coaxially located with each other, and coaxially located with the longitudinal axis 44 of the substrate 42, it should be appreciated that the inlet 38 and the outlet 40 do not need to be coaxially positioned relative to each other, nor do the inlet 38 or the outlet 40 need to be coaxial positioned relative to the longitudinal axis 44 of the substrate 42.

A catalytic composition 46 is suspended in a washcoat, and is disposed on the substrate 42 as is known in the art. The catalytic composition 46 reacts with the flow of exhaust gas 24. For example, the catalytic composition 46 may reduce nitrogen oxides ($NO_x$) in the exhaust gas 24 to nitrogen and oxygen, oxidize carbon monoxide (CO) in the exhaust gas 24 to carbon dioxide, or oxidize hydrocarbons (HCs) in the exhaust gas 24 to carbon dioxide and water. The catalytic composition 46 may include, but is not limited to, at least one of: platinum, palladium, rhodium, cerium, iron, manganese, nickel, copper, or aluminum oxide. The specific catalytic composition 46 and the specific reaction with the exhaust gas 24 for treating the exhaust gas 24 are not pertinent to the teachings of the disclosure, and are therefore not described in detail herein.

The substrate 42 includes a cavity 48. As shown in the exemplary embodiments of the Figures, the cavity 48 extends along a cavity axis 50, which is transverse to the longitudinal axis 44 of the substrate 42. More specifically, the cavity axis 50 is generally perpendicular to the longitudinal axis 44 of the substrate 42. As shown in the exemplary embodiments of the Figures, the cavity 48 is disposed at an approximate midsection of the substrate 42 along the longitudinal axis 44, between the inlet 38 and the outlet 40. However, it should be appreciated that the cavity 48 is not required to be disposed at the approximate midsection of the substrate 42, and may be disposed nearer the inlet 38 than the outlet 40, or nearer the outlet 40 than the inlet 38.

The treatment device 30 includes a sensor 52. The sensor 52 is attached to and supported by the housing 32. The sensor 52 includes a probe 54 that at least partially extends into the cavity 48 of the substrate 42. The wall 34 of the housing 32 includes an opening 56 extending through the wall 34, adjacent the cavity 48 in the substrate 42. The probe 54 of the sensor 52 extends or passes through the opening 56 in the wall 34, and at least partially into the cavity 48. The probe 54 extends in a direction that is generally transverse to the longitudinal axis 44 of the substrate 42. As shown in the exemplary embodiment, the probe 54 extends along the cavity axis 50. However, it should be appreciated that the probe 54 may be angled relative to the cavity axis 50.

The sensor 52 may include, but is not limited to, one of a $NO_x$ sensor 52, an oxygen ($O_2$) sensor 52, a particulate matter sensor, or an ammonia ($NH_3$) sensor. The specific type of sensor 52 and the chemical compound that the sensor 52 is configured to detect and/or measure is not pertinent to the teachings of this disclosure, and are therefore not described in detail herein. The sensor 52 communicates with a vehicle controller 53, such as but not limited to an engine control module, engine control unit, etc. The vehicle controller 53 uses the information or data received from the sensor 52 to control the operation of the engine 20, as is known in the art.

The cavity 48 in the substrate 42 includes a shape that is operable to increase the flow of exhaust gas 24 near an outer surface 58 of the substrate 42, relative to the flow of exhaust gas 24 near a longitudinal center of the substrate 42, i.e., near the longitudinal axis 44 of the substrate 42. Additionally, the shape of the cavity 48 is operable to direct the flow of exhaust gas 24 toward the probe 54 of the sensor 52, which may be positioned adjacent the wall 34 of the housing 32. By increasing the flow of exhaust gas 24 near the outer surface 58 of the substrate 42, and directing the flow of exhaust gas 24 toward the probe 54 of the sensor 52, the shape of the cavity 48 operates to mix the exhaust gas 24, thereby enabling the sensor 52 to obtain a more accurate sampling of the exhaust gas 24, without the use of other devices, such as a snorkel or the like.

The specific shape of the cavity 48 may vary, depending upon for example, the shape and size of the housing 32 and the substrate 42, the particular catalytic compound disposed on the substrate 42, or the specific type of sensor 52 or chemical composition that the sensor 52 is sampling the exhaust gas 24 for.

Figure 2:
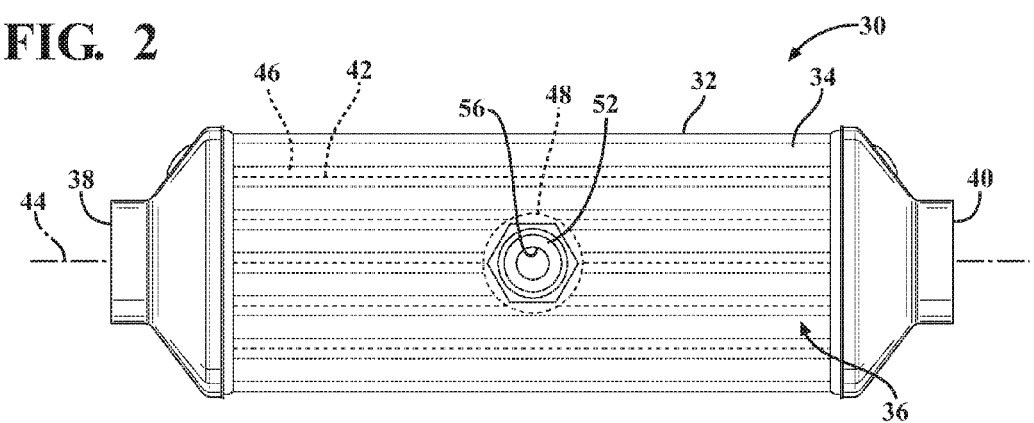
FIG. 2 is a schematic plan view of a first embodiment of an exhaust gas treatment device.
Figure 3:
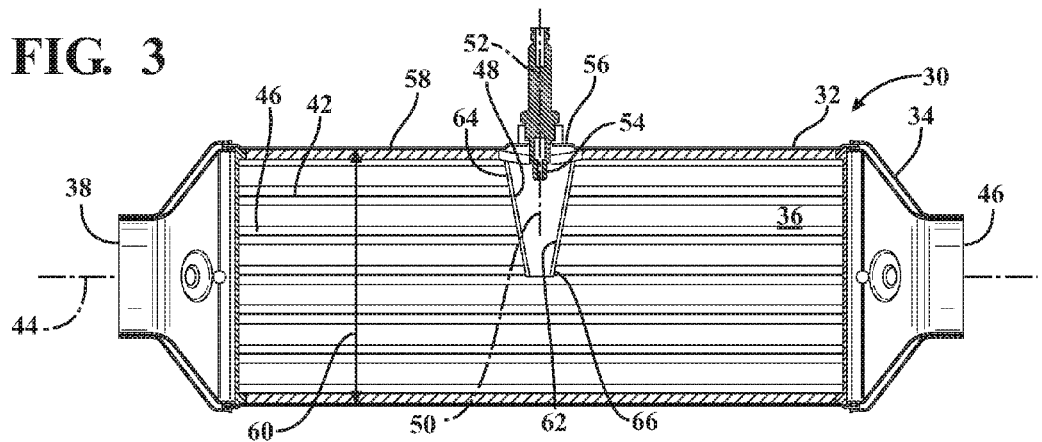
FIG. 3 is a schematic cross sectional side view of the first embodiment of the exhaust gas treatment device.

Referring to FIGS. 2 and 3, a first embodiment of the cavity 48 is generally shown. As shown in FIGS. 2 and 3, the cavity 48 includes a generally conical shape, which is concentric with the cavity axis 50. The cavity 48 extends only partially into the substrate 42. Accordingly, the cavity 48 does not extend across a width 60 of the substrate 42. The width 60 of the substrate 42 may be measured perpendicularly relative to the longitudinal axis 44 of the substrate 42. The generally conical shape of the cavity 48 includes a radius 62 that increases as a distance from the longitudinal center of the substrate 42 increases. Accordingly, a larger end 64 of the truncated cone shaped cavity 48 is disposed adjacent the wall 34 of the housing 32, and a smaller end 66 of the truncated cone shaped cavity 48 is disposed adjacent the longitudinal axis 44 of the substrate 42. The larger end 64 of the cavity 48 provides a lower flow resistance relative to the smaller end 66 of the cavity 48, which increase the flow of exhaust gas 24 near the outer surface 58 of the substrate 42, adjacent the wall 34 of the housing 32, relative to the longitudinal center of the substrate 42. This mass flow distribution is opposite the general flow characteristics of the substrate 42, which generally provide greater flow near the longitudinal center of the substrate 42, and lesser flow near the outer surface 58 of the substrate 42.

Figure 4:
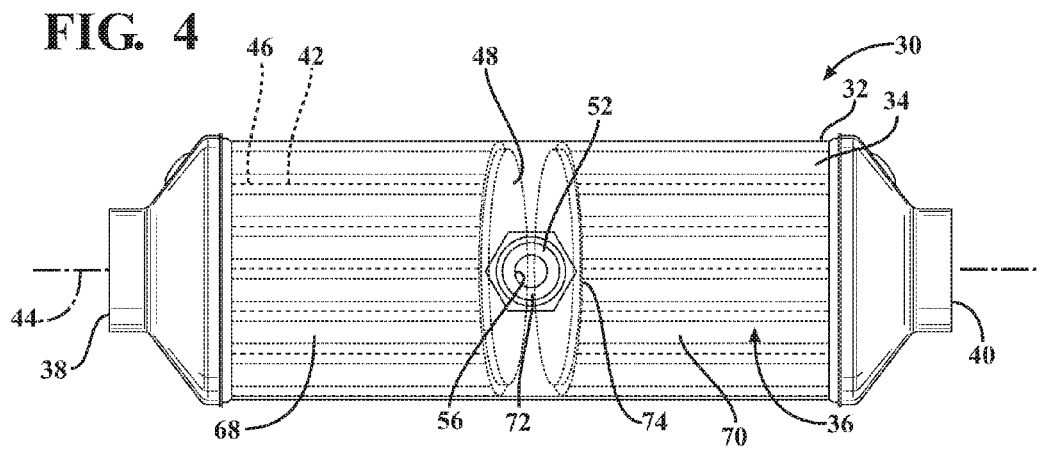
FIG. 4 is a schematic plan view of a second embodiment of the exhaust gas treatment device.
Figure 5:
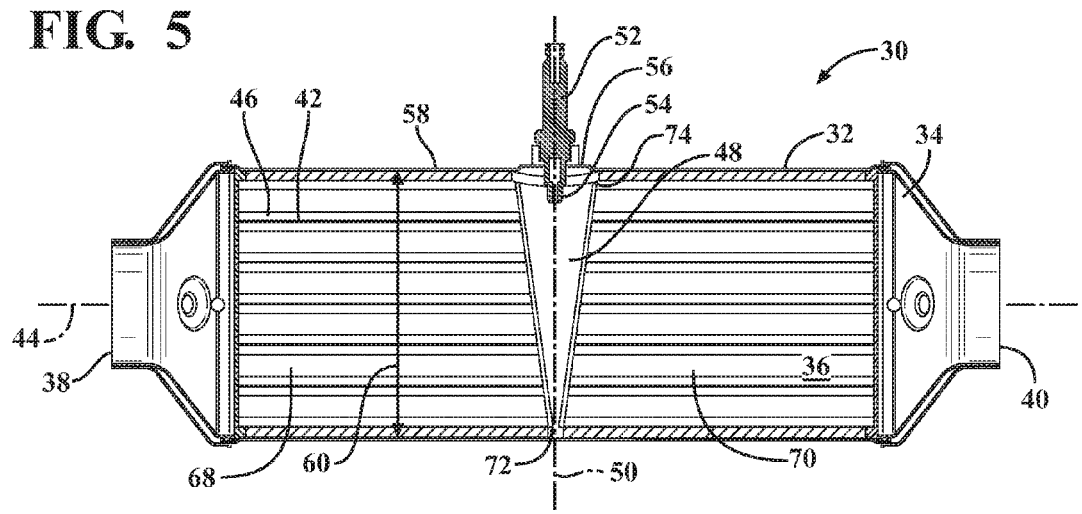
FIG. 5 is a schematic cross sectional side view of the second embodiment of the exhaust gas treatment device.
Figure 6:
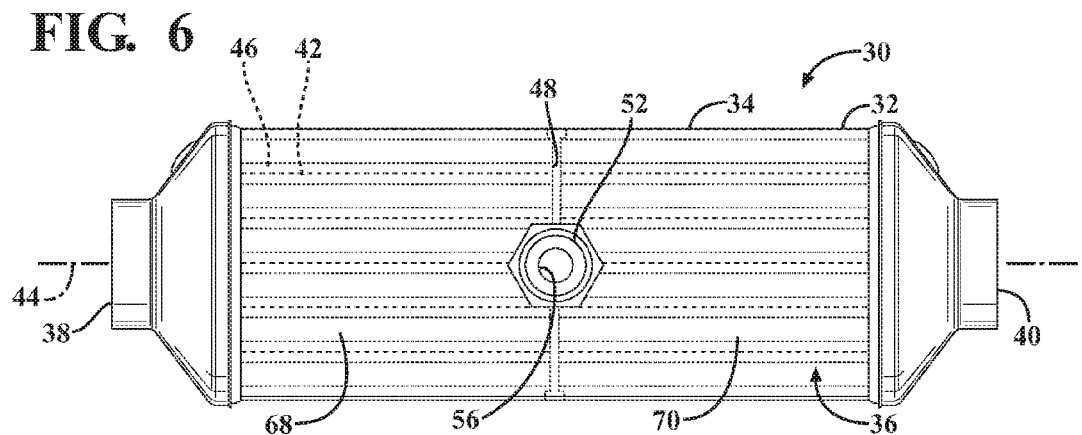
FIG. 6 is a schematic plan view of a third embodiment of the exhaust gas treatment device.
Figure 7:
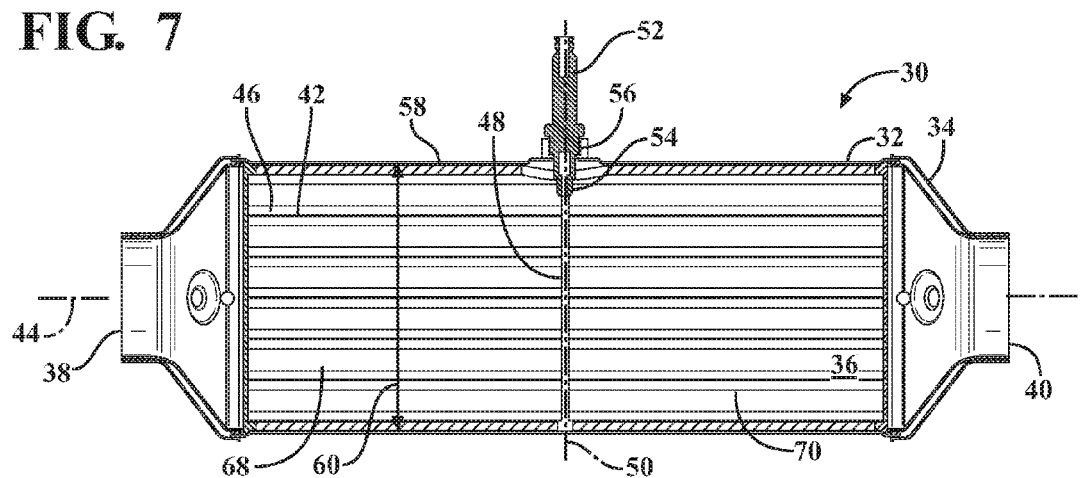
FIG. 7 is a schematic cross sectional side view of the third embodiment of the exhaust gas treatment device.

A second embodiment of the cavity 48 is generally shown in FIGS. 4 and 5, and at third embodiment of the cavity 48 is generally shown in FIGS. 6 and 7. Both the second embodiment of the cavity 48 and the third embodiment of the cavity 48 include the shape of the cavity 48 extending substantially across the entire width 60 of the substrate 42, transverse to the longitudinal axis 44 of the substrate 42. Accordingly, the cavity 48 shown in FIGS. 4 through 7 generally bisects the substrate 42 into an upstream half 68 and a downstream half 70. The upstream half 68 and the downstream half 70 may be integral and connected together. Alternatively, the upstream half 68 and the downstream half 70 may be two separate and independent structures.

Referring to FIGS. 4 and 5, the shape of the second embodiment of the cavity 48 includes a cross section along the longitudinal axis 44 having a generally triangular shape, best shown in FIG. 4 that extends across the entire width 60 of the substrate 42. The triangular cross section of the shape of the second embodiment of the cavity 48 includes a narrow apex 72 disposed opposite the probe 54 of the sensor 52, and a larger base 74 disposed adjacent the probe 54. This shape increases the flow resistance near the apex 72, and reduces the flow resistance near the base 74, thereby increasing the flow of exhaust gas 24 adjacent the outer surface 58 of the substrate 42 disposed near the probe 54 of the sensor 52, which helps mix and direct the flow of exhaust gas 24 to the probe 54.

Referring to FIGS. 6 and 7, the shape of the third embodiment of the cavity 48 includes a generally planar shape, which extends across the entire width 60 of the substrate 42. The planar shape is aligned along the cavity axis 50, with the probe 54.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. An exhaust gas treatment device comprising:
a housing defining an interior chamber;
a substrate having a flow through structure and supported by the housing within the interior chamber of the housing;
a catalytic composition disposed on the substrate for reacting with a flow of exhaust gas;
wherein the substrate includes a cavity having a shape operable to increase the flow of exhaust gas near an outer surface of the substrate, relative to the flow of exhaust gas near a longitudinal center of the substrate;
wherein the shape of the cavity includes a conical shape having a radius that increases as a distance from the longitudinal center of the substrate increases; and
a sensor attached to the housing and including a probe at least partially extending into the cavity of the substrate.

2. The exhaust gas treatment device set forth in claim 1, wherein the sensor is one of a $NO_x$ sensor, an oxygen sensor, a particulate matter sensor, or an ammonia sensor.

3. The exhaust gas treatment device set forth in claim 1, wherein the catalytic composition includes at least one of: platinum, palladium, rhodium, cerium, iron, manganese, nickel, copper, or aluminum oxide.

4. The exhaust gas treatment device set forth in claim 1, wherein the housing includes an inlet for receiving the flow of exhaust gas, and an outlet for discharging the flow of exhaust gas, with the substrate extending along a longitudinal axis between the inlet and the outlet.

5. The exhaust gas treatment device set forth in claim 4, wherein the cavity is disposed at an approximate midsection of the substrate along the longitudinal axis, between the inlet and the outlet.

6. The exhaust gas treatment device set forth in claim 4, wherein the housing includes a wall forming the interior chamber, and wherein the wall includes an opening with the probe of the sensor passing through the opening in the wall.

7. The exhaust gas treatment device set forth in claim 4, wherein the cavity extends along a cavity axis that is transverse relative to the longitudinal axis of the substrate.

8. The exhaust gas treatment device set forth in claim 7, wherein the cavity axis is perpendicular to the longitudinal axis of the substrate.

9. The exhaust gas treatment device set forth in claim 4, wherein the probe extends in a direction that is generally transverse to the longitudinal axis of the substrate.

10. The exhaust gas treatment device set forth in claim 1, wherein the shape of the cavity is operable to direct the flow of exhaust gas toward the probe of the sensor.

11. The exhaust gas treatment device set forth in claim 1, wherein the shape of the cavity includes a cross section along the longitudinal axis having a triangular shape.

12. An engine system comprising:
an internal combustion engine operable to produce a flow of exhaust gas;
an exhaust gas treatment system coupled to the internal combustion engine for receiving the flow of exhaust gas, the exhaust gas treatment system including a treatment device including:
a housing having a wall defining an interior chamber, and including an inlet for receiving the flow of exhaust gas, and an outlet for discharging the flow of exhaust gas;
a substrate having a flow through structure and supported by the housing within the interior chamber of the housing, the substrate extending along a longitudinal axis generally between the inlet and the outlet of the housing;
wherein the substrate includes a catalytic composition disposed thereon for reacting with the flow of exhaust gas;
wherein the substrate includes a cavity extending along a cavity axis that is transverse to the longitudinal axis of the substrate;
wherein the cavity includes a shape operable to increase the flow of exhaust gas near an outer surface of the substrate, relative to the flow of exhaust gas near a longitudinal center of the substrate;
wherein the shape of the cavity includes a conical shape having a radius that increases as a distance from the longitudinal center of the substrate increases; and
a sensor attached to the housing and including a probe at least partially extending into the cavity of the substrate, for sensing a gaseous component in the flow of exhaust gas.

13. The engine system set forth in claim 12, wherein the shape of the cavity includes a cross section along the longitudinal axis having a triangular shape.

\* \* \* \* \*